United States Patent
Wang et al.

(10) Patent No.: US 11,420,876 B2
(45) Date of Patent: Aug. 23, 2022

(54) HIGH-EFFICIENCY, FAST AND GREEN METHOD FOR PREPARING ZEOLITE MOLECULAR SIEVE

(71) Applicant: SOOCHOW UNIVERSITY, Suzhou (CN)

(72) Inventors: Shuao Wang, Suzhou (CN); Mingxing Zhang, Suzhou (CN); Junchang Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 107 days.

(21) Appl. No.: 16/970,621

(22) PCT Filed: Jan. 9, 2020

(86) PCT No.: PCT/CN2020/071075
§ 371 (c)(1),
(2) Date: Aug. 17, 2020

(87) PCT Pub. No.: WO2020/238233
PCT Pub. Date: Dec. 3, 2020

(65) Prior Publication Data
US 2022/0033270 A1 Feb. 3, 2022

(30) Foreign Application Priority Data

May 29, 2019 (CN) .......................... 201910454936.4

(51) Int. Cl.
| | | |
|---|---|---|
| *B01J 37/34* | (2006.01) | |
| *C01B 39/48* | (2006.01) | |
| *C01B 39/02* | (2006.01) | |
| *C01B 39/14* | (2006.01) | |
| *C01B 39/20* | (2006.01) | |
| *C01B 39/54* | (2006.01) | |

(52) U.S. Cl.
CPC .............. *C01B 39/48* (2013.01); *B01J 37/34* (2013.01); *C01B 39/026* (2013.01); *C01B 39/145* (2013.01); *C01B 39/205* (2013.01); *C01B 39/54* (2013.01); *C01P 2002/72* (2013.01)

(58) Field of Classification Search
None
See application file for complete search history.

(56) References Cited

U.S. PATENT DOCUMENTS

| | | | | |
|---|---|---|---|---|
| 4,440,871 | A * | 4/1984 | Lok ........................... | C07C 2/54 |
| | | | | 208/136 |
| 9,643,172 | B2 * | 5/2017 | Dai ........................ | B01J 23/681 |
| 2003/0232718 | A1 * | 12/2003 | Cao .......................... | C01B 39/54 |
| | | | | 502/214 |
| 2007/0189961 | A1 * | 8/2007 | Lacopi .............. | H01L 21/02216 |
| | | | | 327/100 |
| 2016/0264428 | A1 * | 9/2016 | Moulton ................ | B01J 37/082 |

FOREIGN PATENT DOCUMENTS

| | | | |
|---|---|---|---|
| CA | 2958870 | * | 2/2015 |
| CN | 101531376 A | | 9/2009 |
| CN | 101693541 A | | 4/2010 |
| CN | 104528755 | * | 12/2014 |
| CN | 105668585 A | | 6/2016 |
| CN | 106829993 A | | 6/2017 |
| CN | 108502897 A | | 9/2018 |
| CN | 110156039 A | | 8/2019 |
| JP | S638211 A | | 1/1988 |
| JP | 2006273623 A | | 10/2006 |
| VN | 56286 | * | 2/2018 |

OTHER PUBLICATIONS

Zhikuan Yang et al., Pollution Control Chemistry, Wuhan University Press, Sep. 30, 1998.
Fei Zhao et al., Study on Synthesis of MA-PEG Type Diesel Depressant, Specialty Petrochemicals, vol. 33,No. 4, pp. 69-75, Jul. 31, 2016.

* cited by examiner

*Primary Examiner* — Sheng H Davis
(74) *Attorney, Agent, or Firm* — SZDC Law P.C.

(57) ABSTRACT

A method for preparing a zeolite molecular sieve includes the steps of: (1) mixing at least one of a silicon source, an aluminum source and a phosphorus source with an alkaline substance, a template agent and water uniformly to obtain a zeolite molecular sieve precursor solution; aging the zeolite molecular sieve precursor solution at 20-30° C. for 10-15 h; and subjecting the aged solution to ionizing radiation, and then washing the obtained solid to neutrality and drying to obtain the zeolite molecular sieve. The method of the present invention is green, simple and extremely cost-effective. Under the irradiation of an ionizing radiation source, the synthesis period of zeolite molecular sieve is short and no heating is needed in the preparation process, so energy consumption is reduced and a high-pressure system is avoided.

10 Claims, 3 Drawing Sheets

HIGH-EFFICIENCY, FAST AND GREEN METHOD FOR PREPARING ZEOLITE MOLECULAR SIEVE

This application is the National Stage Application of PCT/CN2020/071075, filed on Jan. 9, 2020, which claims priority to Chinese Patent Application No. 201910454936.4, filed on May 29, 2019, which is incorporated by reference for all purposes as if fully set forth herein.

FIELD OF THE INVENTION

The present invention relates to the technical field of preparation of molecular sieves, and more particularly to a high-efficiency, fast and green method for preparing zeolite molecular sieves.

DESCRIPTION OF THE RELATED ART

Zeolite molecular sieves refer to inorganic crystalline materials with regular pore structure, certain orientation and definite pore size, mainly include aluminum, silicon, oxygen, phosphorus and other metal cations, and have a three-dimensional network skeleton structure generally composed of $TO_4$ (where T is mainly Al, Si, or P) tetrahedrons. Depending on the skeleton elements, the zeolite molecular sieves can be divided into silico-alumina zeolite molecular sieve, aluminophosphate zeolite molecular sieve, and silica zeolite molecular sieve, etc. Due to the regular pore size distribution and rich topology, the zeolite molecular sieves have the performances such as adsorption, catalysis, ion exchange, acid and alkali resistance and the like, and are usually used as adsorbents, catalysts, ion exchangers, desiccants, and feed additives, etc, in wide areas involving industry, agriculture, national defense and other departments.

At present, the synthesis methods for zeolite molecular sieves mainly include hydrothermal synthesis, ionothermal synthesis, vapor-phase conversion, dry gel synthesis, solvent-free synthesis and microwave synthesis. Hydrothermal synthesis is to form the zeolite molecular sieve by dispersing a precursor for synthesizing the zeolite molecular sieve in water, followed by nucleation, growth, crystallization and other processes at a certain temperature under an autogenous pressure. This method has the advantages of low cost, excellent crystallinity, and diversely available solvents, and can be easily industrialized. Ionothermal synthesis comprises dispersing the raw materials for synthesizing the zeolite molecular sieve in an ionic liquid or an eutectic mixture, and then synthesizing the zeolite molecular sieve at a certain temperature. This method utilizes a low-pressure reaction and thus is safe. Vapor-phase synthesis comprises preparing a template agent-free zeolite molecular sieve precursor into a dry gel, and then converting the dry gel into a zeolite molecular sieve at a certain temperature in the presence of a small amount of organic amine and water as a liquid phase. The method is green, the mixed solvent is recyclable, and the product has high crystallinity. Dry gel synthesis comprises preparing the raw materials for synthesizing the zeolite molecular sieve into an amorphous dry gel, then drying the dry gel into a dry powder, and finally synthesizing the zeolite molecular sieve under a water vapor atmosphere. In this method, less template agent is used and the yield is improved. Solvent-free synthesis comprises grinding the raw materials for synthesizing the zeolite molecular sieve in a mortar thoroughly and putting it into a polytetrafluoroethylene reactor, sealing, and synthesizing the zeolite molecular sieve at a high temperature. This method is solvent-free and safe. Microwave synthesis comprises fully mixing the raw materials for synthesizing the zeolite molecular sieve, feeding to a reactor, and then synthesizing the zeolite molecular sieve by microwave heating. The method takes a short time, and the synthesized zeolite molecular sieve has small particle size.

Currently, the popular method for preparing zeolite molecular sieve in industry is still hydrothermal synthesis. This technology has the advantages of long crystallization time and long synthesis period of the product, and presence of an impurity phase in the synthesized product. Moreover, the reaction needs to be carried out at a high temperature, and a vapor pressure will be generated during the reaction, which raises high requirements for the reaction equipment.

SUMMARY OF THE INVENTION

To solve the above technical problems, an object of the present invention is to provide a high-efficiency, fast and green method for preparing zeolite molecular sieve. The method of the present invention is a green, simple and extremely low-cost preparation method. Under the irradiation of an ionizing radiation source, the synthesis period of zeolite molecular sieve is short and no heating is needed in the preparation process, so energy consumption is reduced, and a high-pressure system is avoided.

To solve the above technical problems, the following technical solutions are utilized in the present invention.

The present invention provides a method for preparing a zeolite molecular sieve, which includes the steps of:

(1) mixing at least one of a silicon source, an aluminum source and a phosphorus source with an alkaline substance, a template agent and water uniformly to obtain a zeolite molecular sieve precursor solution, and aging the zeolite molecular sieve precursor solution at 20-30° C. for 10-15 h; and (2) subjecting the aged solution to ionizing radiation to obtain a solid, and then washing the solid to neutrality and drying to obtain the zeolite molecular sieve.

Preferably, in Step (1), the silicon source is selected from the group consisting of $Na_2SiO_3$, silica, silica gel, tetraethyl orthosilicate and any combination thereof.

Preferably, in Step (1), the aluminum source is selected from the group consisting of $NaAlO_2$, alumina, aluminum hydroxide, aluminum sulfate, aluminum isopropoxide and any combination thereof.

Preferably, in Step (1), the phosphorus source is selected from the group consisting of phosphoric acid, sodium phosphate, disodium hydrogen phosphate, sodium dihydrogen phosphate and any combination thereof.

Preferably, in Step (1), the alkaline substance is selected from of NaOH, aqueous ammonia, and trimethylamine and any combination thereof.

Preferably, in Step (1), the template agent is selected from the group consisting of tetrapropylammonium bromide, tetrabutylammonium bromide, tetraethylammonium bromide, tetrapropylammonium hydroxide, ammonium fluoride, aqueous ammonia and any combination thereof.

Preferably, in Step (1), the molar ratio of the sum of the moles of the silicon source, the aluminum source and the phosphorus source, to the alkaline substance, the template agent and the water is 1.5-2:30-40:1:300-400. Preferably, the molar ratio of the sum of the moles of the silicon source, the aluminum source and the phosphorus source to the alkaline substance, the template agent and the water is 1.8:35:1:350.

In an embodiment of the present invention, Step (1) includes specifically:

(S1) dissolving a silicon source and an aluminum source in water and water containing an alkaline substance, respectively, to obtain a silicon source aqueous solution and an aluminum source aqueous solution; and (S2) adding a template agent to the silicon source aqueous solution, and then adding the aluminum source aqueous to the silicon source aqueous solution and mixing uniformly, and aging at 20-30° C. for 10-15 h.

Preferably, in Step (2), the radiation source of ionizing radiation is electron beams, y rays, X-rays, and heavy ion beams. More preferably, the radiation source of ionizing radiation is an electron beam, and the aged solution is irradiated under an electron accelerator. The accelerator can continuously generate an electron beam, thereby enabling continuous and rapid preparation of zeolite molecular sieves, which is suitable for industrial production.

In an embodiment, in Step (2), the ionizing radiation dose is 300-2000 kGy; and the ionizing radiation time is 4-30 min. Preferably, the ionizing radiation dose is 500-1000 kGy. By the method provided in the present invention, a zeolite molecular sieve can be quickly prepared. With the increase of the absorption dose of irradiation, the crystallinity of the synthesized zeolite molecular sieve gradually increases, and no impurity phase is present.

Preferably, in Step (2), ionizing radiation is performed at room temperature (20-30° C.) without heating.

The zeolite molecular sieves prepared in the method of the present invention include silico-alumina zeolite molecular sieve, aluminophosphate zeolite molecular sieve, and silica zeolite molecular sieve.

By virtue of the above solution, the present invention has the following advantages.

In the present invention, radiant energy is used to replace the traditional heat energy. The method is simple and extremely low-effective. The preparation method of the present invention relies on the interaction of ionizing radiation with the materials to convert the radiation energy into the energy required in the reaction system for the synthesis of zeolite molecular sieve. The preparation method of the zeolite molecular sieve provided in the present invention has the advantages of simple operation, fast crystallization of product and extremely short synthesis period. No heating is needed in the reaction process, the entire reaction system is open and the high-pressure system is avoided. Thus, the energy consumption is low and only the low requirements are needed for the reaction vessel. Compared with the traditional hydrothermal synthesis, by the method provided in the present invention, a zeolite molecular sieve can be quickly prepared, the reaction equipment is simple and safe, and continuously production can be enabled. Therefore, the method provided in the present invention is suitable for industrial production.

The above description is only an overview of the technical solutions of the present invention. In order to illustrate the technical means of the present invention more clearly and implement the technical solution in accordance with the specification, the preferred embodiments of the invention are described hereinafter in more detail by reference to the accompanying drawings.

DETAILED DESCRIPTION OF THE PREFERRED EMBODIMENTS

The invention will be further illustrated in more detail with reference to the accompanying drawings and embodiments. It is noted that, the following embodiments only are intended for purposes of illustration, but are not intended to limit the scope of the present invention.

Example 1: Synthesis of Na-A Type Zeolite Molecular Sieve (1) Preparation of a precursor solution: 6.11 g of $Na_2SiO_3 \cdot 9H_2O$ was added to 10 g of deionized water, and heated in an oven at 60° C. for 3-5 min to obtain a clear sodium silicate solution A. 2.5 g of $NaAlO_2$ was dissolved in 10.0 g $H_2O$ to obtain a clear sodium metaaluminate solution, and then 4.7 g of NaOH was weighed and added into the sodium metaaluminate solution to prepare a solution B.

(2) Aging: 8.0 g of tetrapropylammonium bromide was weighed and added into the solution A, and then the solution B was added dropwise to the solution A with stirring. Then the mixture was stirred at room temperature and aged for 12 h.

Figure 1:
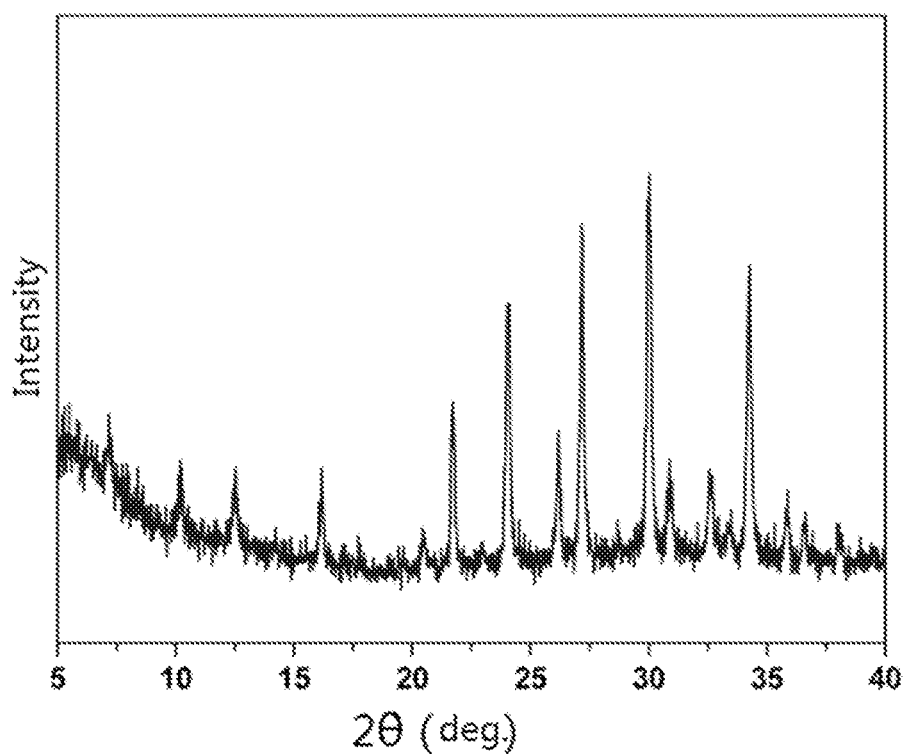
FIG. 1 is a PXRD diffraction pattern of a Na-A type zeolite molecular sieve prepared in Example 1 of the present invention.

(3) Electron beam Irradiation: 0.5 mL of the aged mixed solution was transferred to a 3 mL glass scintillation vial by a 1 mL pipette, and then the sample was irradiated under an electron accelerator, where the absorption dose was 500 kGy, and the irradiation time was 800 s. The white solid produced after the irradiation was washed with deionized water until the washing liquid was neutral, and then washed once with ethanol; and finally the solid product obtained was dried at room temperature. The above reactions were all carried out in an open glass scintillation vial. A polycrystalline X-ray powder diffractometer (PXRD) was used to determine the crystalline structure of the product. The test results are shown in FIG. 1.

Example 2: Synthesis of Na-A Type Zeolite Molecular Sieve

Figure 2:
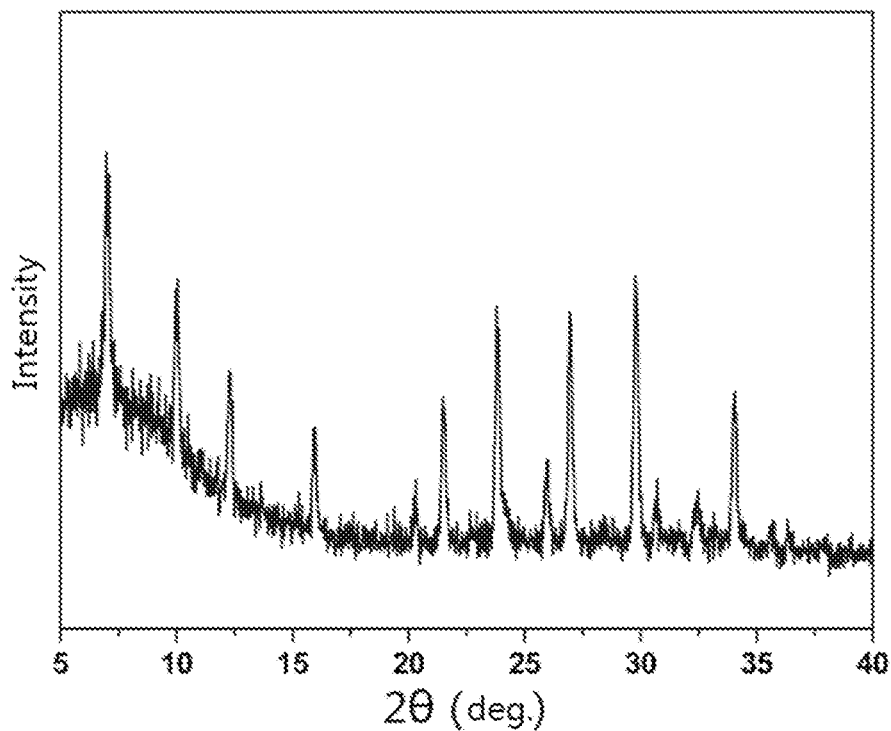
FIG. 2 is a PXRD diffraction pattern of a Na-A type zeolite molecular sieve prepared in Example 2 of the present invention.

The Na-A type zeolite molecular sieve was prepared according to the method of Example 1, except that the absorption dose was 700 kGy and the irradiation time was 1120 s. A polycrystalline X-ray powder diffractometer (PXRD) was used to determine the crystalline structure of the product. The test results are shown in FIG. 2.

Example 3: Synthesis of Na-A Type Zeolite Molecular Sieve

Figure 3:
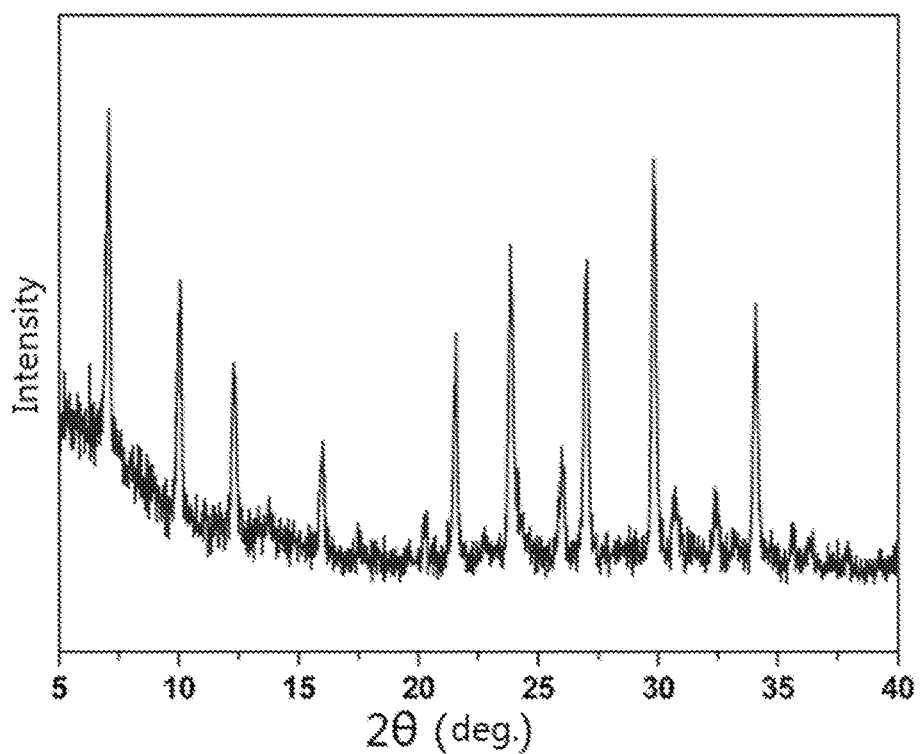
FIG. 3 is a PXRD diffraction pattern of a Na-A type zeolite molecular sieve prepared in Example 3 of the present invention.

The Na-A type zeolite molecular sieve was prepared according to the method of Example 1, except that the absorption dose was 1200 kGy and the irradiation time was 1920 s. A polycrystalline X-ray powder diffractometer (PXRD) was used to determine the crystalline structure of the product. The test results are shown in FIG. 3.

Example 4: Synthesis of Na—X Type Zeolite Molecular Sieve (1) Preparation of a precursor solution: 2.0367 g of $Na_2SiO_3 \cdot 9H_2O$ was added to 5 g of deionized water, and heated in an oven at 60° C. for 3-5 min to obtain an absolutely clear sodium silicate solution Na—X-A. 0.39 g of $NaAlO_2$ was dissolved in 5.0 g $H_2O$ to prepare a clear sodium metaaluminate solution, and then 4.69 g of NaOH was weighed and added into the sodium metaaluminate solution to prepare a solution Na—X—B.

(2) Aging: 3.8702 g of tetrapropyl ammonium hydroxide (TPAOH) was weighed and added into the Na—X-A solution, and then the solution Na—X—B was added dropwise to the solution Na—X-A with stirring. The mixture was aged for 12 h with stirring at room temperature to obtain a Na—X solution.

Figure 4:
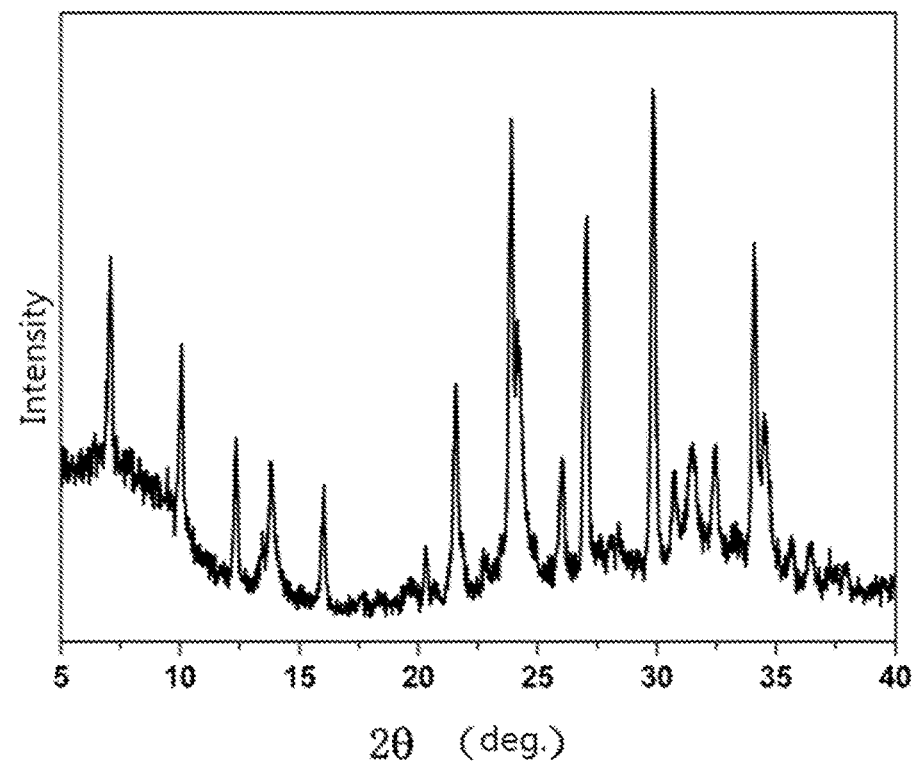
FIG. 4 is a PXRD diffraction pattern of a Na—X type zeolite molecular sieve prepared in Example 4 of the present invention.

(3) Electron beam irradiation: 0.5 mL of the Na—X solution was transferred to a 3 mL glass scintillation via by a 1 mL pipette, fed to an electron accelerator and irradiated at a cumulative irradiation dose of 500 kGy for an irradiation time of 900 s. The white solid produced after the irradiation was washed with deionized water until the washing liquid was neutral, and then washed once with ethanol; and finally the solid product obtained was dried at room temperature. A polycrystalline X-ray powder diffractometer (PXRD) was used to determine the crystalline structure of the product. The test results are shown in FIG. 4.

Example 5: Synthesis of NaZ-21 Type Zeolite Molecular Sieve (1) Preparation of a precursor solution: 2.0367 g of $Na_2SiO_3 \cdot 9H_2O$ was added to 5 g of deionized water, and heated in an oven at 60° C. for 3-5 min to obtain an absolutely clear sodium silicate solution NaZ-21-A. 0.58 g of $NaAlO_2$ was dissolved in 5.0 g $H_2O$ to prepare a clear sodium metaaluminate solution, and then 5 g of NaOH was weighed and added into the sodium metaaluminate solution to prepare a solution NaZ-21-B.

(2) Aging: 5.7557 g of tetrapropyl ammonium hydroxide (TPAOH) was weighed and added into the NaZ-21-A solution, and then the solution NaZ-21-B was added dropwise to the solution NaZ-21-A with stirring. The mixture was aged for 12 h with stirring at room temperature to obtain a NaZ-21 solution.

Figure 5:
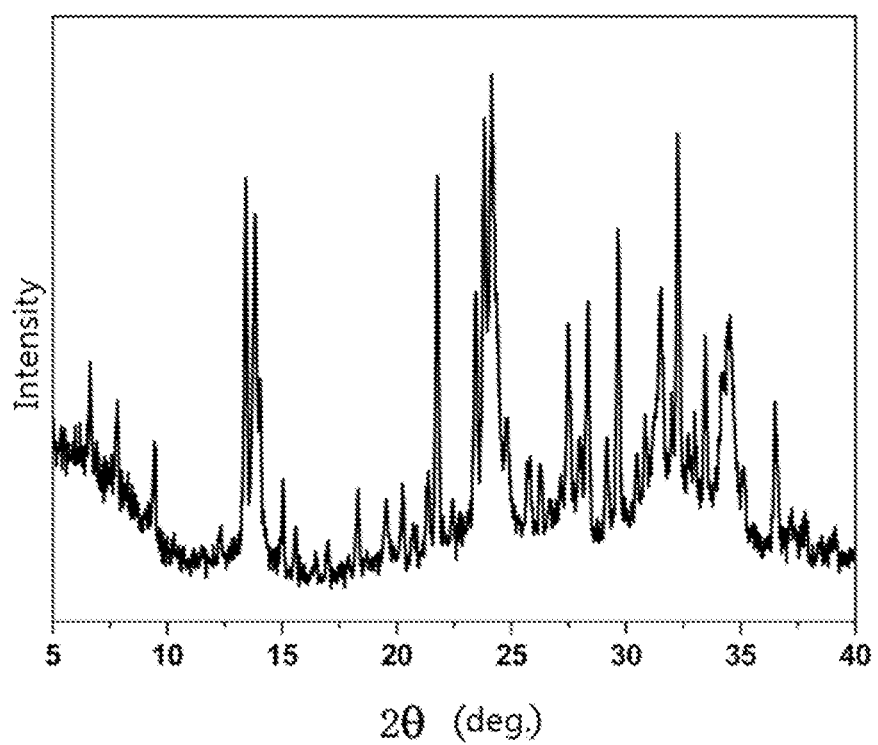
FIG. 5 is a PXRD diffraction pattern of a NaZ-21 type zeolite molecular sieve prepared in Example 5 of the present invention.

(3) Electron beam irradiation: 0.5 mL of the NaZ-21 solution was transferred to a 3 mL glass scintillation via by a 1 mL pipette, fed to an electron accelerator and irradiated at a cumulative irradiation dose of 500 kGy for an irradiation time of 900 s. The white solid produced after the irradiation was washed with deionized water until the washing liquid was neutral, and then washed once with ethanol; and finally the solid product obtained was dried at room temperature. A polycrystalline X-ray powder diffractometer (PXRD) was used to determine the crystalline structure of the product. The test results are shown in FIG. 5.

In the present invention, the ionizing radiation is used to prepare the zeolite molecular sieve. The ionizing radiation source is widely available and gives a wide range of absorption dose, with which numerous types of zeolite molecular sieve can be prepared. The method requires simple technical means and cheap equipment for preparing the zeolite molecular sieve, and is green and extremely cost-effective. Under the irradiation of an ionizing radiation source, the zeolite molecular sieve can be synthesized in 4-30 min, which greatly shortens the synthesis period. No heating is required during the preparation process, which reduces the energy consumption and avoids a high-pressure system.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A method for preparing a zeolite molecular sieve, comprising steps of:
   (1) mixing at least one of a silicon source, an aluminum source and a phosphorus source with an alkaline substance, a template agent and water uniformly to obtain a zeolite molecular sieve precursor solution, and aging the zeolite molecular sieve precursor solution at 20-30° C. for 10-15 h; and
   (2) subjecting the aged solution to ionizing radiation to obtain a solid, and then washing the solid to neutrality and drying to obtain the zeolite molecular sieve,
   wherein heating and a high-pressure system are not needed for preparing zeolite molecular sieve; and
   wherein in Step (2), the ionizing radiation time is 4-30 min.

2. The method according to claim 1, wherein in Step (1), the silicon source is selected from the group consisting of $Na_2SiO_3$, silica, silica gel, tetraethyl orthosilicate and any combination thereof.

3. The method according to claim 1, wherein in Step (1), the aluminum source is selected from the group consisting of $NaAlO_2$, alumina, aluminum hydroxide, aluminum sulfate, aluminum isopropoxide and any combination thereof.

4. The method according to claim 1, wherein in Step (1), the phosphorus source is selected from the group consisting of phosphoric acid, sodium phosphate, disodium hydrogen phosphate, sodium dihydrogen phosphate and any combination thereof.

5. The method according to claim 1, wherein in Step (1), the alkaline substance is selected from the group consisting of NaOH, aqueous ammonia, trimethylamine and any combination thereof.

6. The method according to claim 1, wherein in Step (1), the template agent is selected from the group consisting of tetrapropylammonium bromide, tetrabutylammonium bromide, tetraethylammonium bromide, tetrapropylammonium hydroxide, ammonium fluoride, aqueous ammonia and any combination thereof.

7. The method according to claim 1, wherein in Step (1), the molar ratio of the sum of the moles of the silicon source, the aluminum source and the phosphorus source to the alkaline substance, the template agent and the water is 1.5-2:30-40:1:300-400.

8. The method according to claim 1, wherein in Step (2), the radiation source of ionizing radiation is electron beams, y rays, X-rays, or heavy ion beams.

9. The method according to claim 8, wherein in Step (2), the ionizing radiation dose is 300-2000 kGy.

10. The method according to claim 1, wherein in Step (2), the ionizing radiation dose is 300-2000 kGy.

* * * * *